United States Patent
Kadowaki

(10) Patent No.: US 12,498,830 B2
(45) Date of Patent: Dec. 16, 2025

(54) PEN SENSOR

(71) Applicant: Wacom Co., Ltd., Saitama (JP)

(72) Inventor: Jun Kadowaki, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/664,098

(22) Filed: May 14, 2024

(65) Prior Publication Data

US 2025/0060850 A1 Feb. 20, 2025

(30) Foreign Application Priority Data

Aug. 16, 2023 (JP) ................. 2023-132649

(51) Int. Cl.
| | | |
|---|---|---|
| *G06F 3/044* | (2006.01) | |
| *G06F 3/0354* | (2013.01) | |
| *G06F 3/041* | (2006.01) | |

(52) U.S. Cl.
CPC ........ *G06F 3/0442* (2019.05); *G06F 3/03545* (2013.01); *G06F 3/04162* (2019.05); *G06F 3/0445* (2019.05); *G06F 3/0446* (2019.05); *G06F 3/0448* (2019.05); *G06F 2203/04107* (2013.01); *G06F 2203/04112* (2013.01)

(58) Field of Classification Search
CPC .............. G06F 3/0442; G06F 3/03545; G06F 3/04162; G06F 3/0445; G06F 3/0448; G06F 2203/04107; G06F 2203/04112
See application file for complete search history.

(56) References Cited

U.S. PATENT DOCUMENTS

| | | | |
|---|---|---|---|
| 2017/0228052 A1* | 8/2017 | Nakamura | G06F 3/0445 |
| 2018/0300007 A1* | 10/2018 | Xu | G06F 3/0445 |
| 2023/0195266 A1 | 6/2023 | Kadowaki | |
| 2023/0400949 A1* | 12/2023 | Kadowaki | G06F 3/0442 |

FOREIGN PATENT DOCUMENTS

| | | | | |
|---|---|---|---|---|
| JP | 7025606 B1 | 2/2022 | | |
| WO | WO-2022044595 A1 * | 3/2022 | ......... | G06F 3/03545 |

* cited by examiner

*Primary Examiner* — Patrick N Edouard
*Assistant Examiner* — Joseph P Fox
(74) *Attorney, Agent, or Firm* — Seed Intellectual Property Law Group LLP

(57) ABSTRACT

Provided is a pen sensor for use in detecting an active pen. The pen sensor includes a first layer including a group of first sensor electrodes and a group of first dummy patterns, and a second layer including a group of second sensor electrodes and a group of second dummy patterns. The first dummy patterns and the second dummy patterns are overlaid with each other when viewed from above the pen sensor.

11 Claims, 9 Drawing Sheets

PEN SENSOR

BACKGROUND

Technical Field

The present disclosure relates to a pen sensor. More particularly, the disclosure relates to a pen sensor that receives a pen signal transmitted by an active pen.

Description of the Related Art

There exists electronic equipment of the related art which permits pen input by deriving the position of an active pen on a panel plane. This type of electronic equipment has a sensor inside the panel plane to detect the pen signal transmitted by the active pen (the sensor will be referred to as the pen sensor hereunder). The pen sensor is formed by a plurality of sensor electrodes that are arranged at equal distances apart in a y direction and extend in parallel with each other in an x direction and by a plurality of sensor electrodes that are arranged at equal distances apart in the x direction and extend in parallel with each other in the y direction.

Japanese Patent No. 7025606 (hereinafter, referred to as Patent Document 1) discloses an example of electronic equipment having such a pen sensor. As described in Patent Document 1, the pen sensor may be vulnerable to the problem of being unable to correctly derive the position of the active pen due to a reduced signal level of the sensor electrodes peripheral to (peripheral sensor electrodes) the sensor electrode directly under (central sensor electrode) a pen tip electrode of the active pen. The electronic equipment described in Patent Document 1 is arranged to have a conductive cover film covering the top surface of the pen sensor in a manner forming pen signal flow passages radiating obliquely from the position of the pen tip electrode. This arrangement is supposed to let the peripheral sensor electrodes fully receive the pen signal.

However, according to the technology described in Patent Document 1, the cover film is required to have conductivity. The requirement gives rise to new problems such as increasing costs and reduced transmittance. There has thus been a need for a technology allowing the peripheral sensor electrodes to fully receive the pen signal while avoiding these new problems.

BRIEF SUMMARY

Embodiments of the present disclosure provide a pen sensor and electronic equipment configured to let the peripheral sensor electrodes fully receive the pen signal while avoiding increasing costs and reduced transmittance.

According to one aspect of the present disclosure, there is provided a pen sensor for use in detecting an active pen, the pen sensor including a first layer including a plurality of first sensor electrodes and a plurality of first dummy patterns, and a second layer including a plurality of second sensor electrodes and a plurality of second dummy patterns. The first dummy patterns and the second dummy patterns are overlaid with each other when viewed from above the pen sensor.

According to another aspect of the present disclosure, there is provided a pen sensor for use in detecting an active pen, the pen sensor including a first layer including a plurality of first sensor electrodes and a plurality of first dummy patterns, and a second layer including a plurality of second sensor electrodes and a plurality of second dummy patterns. The first sensor electrodes and the second dummy patterns are overlaid with each other when viewed from above the pen sensor.

According to a further aspect of the present disclosure, there is provided a pen sensor for use in detecting an active pen, the pen sensor including a first layer including a plurality of first sensor electrodes and a plurality of first conductor patterns formed of a plurality of first dummy patterns, and a second layer including a plurality of second sensor electrodes and a plurality of second conductor patterns formed of a plurality of second dummy patterns. The plurality of first conductor patterns and the plurality of second conductor patterns are arranged such that a pen signal transmitted from the active pen propagates in a planar direction by way of capacitance generated between the first conductor patterns and the second conductor patterns formed to be overlaid with each other when viewed from above.

The present disclosure allows the pen signal to propagate by way of capacitance generated between the conductor patterns in the first layer and those in the second layer. This makes it possible for peripheral sensor electrodes to fully receive the pen signal while avoiding increasing costs and reduced transmittance.

DETAILED DESCRIPTION

Some advantageous embodiments of the present disclosure are described below with reference to the accompanying drawings.

Figure 1A:
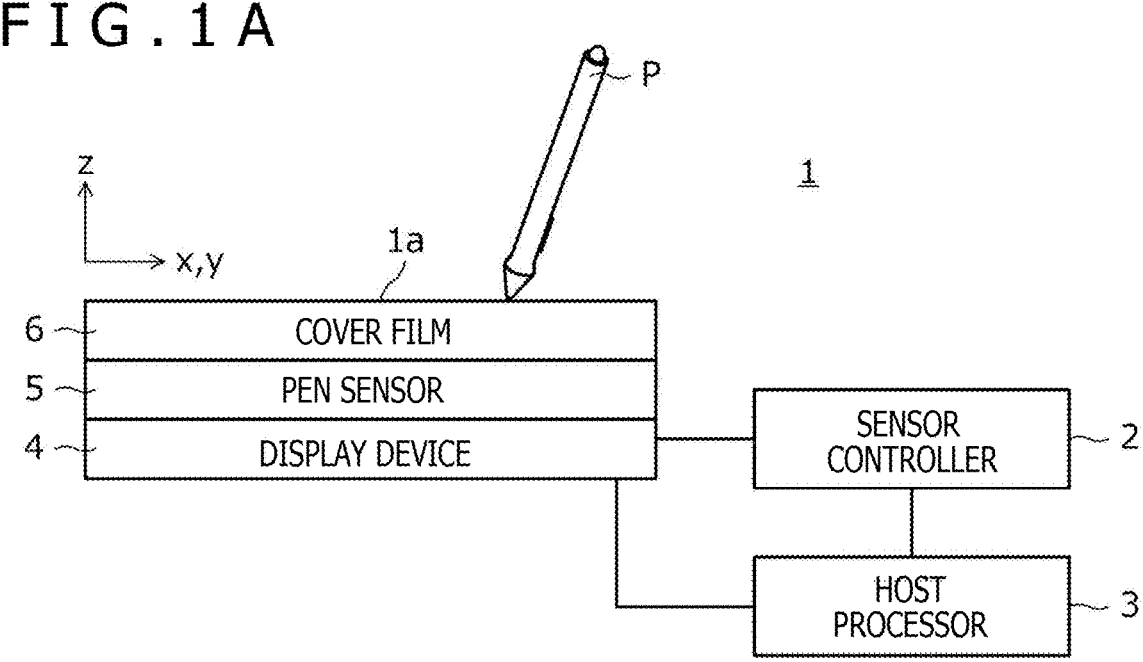
FIG. 1A is a view depicting a configuration of electronic equipment according to a first embodiment of the present disclosure.

FIG. 1A is a view depicting a configuration of electronic equipment 1 according to a first embodiment of the present disclosure. The electronic equipment 1 is a device such as a tablet computer that handles pen input and finger touch input. As depicted in FIG. 1A, the electronic equipment 1 includes a sensor controller 2, a host processor 3, a display device 4, a pen sensor 5, and a cover film 6.

FIG. 1A also depicts an active pen P that performs pen input to the electronic equipment 1. The active pen P is a stylus operating by the active capacitance method. The active pen P is configured to transmit, to the sensor controller 2, a pen signal that includes a burst signal as an unmodulated carrier signal and a data signal as a carrier signal modulated with various kinds of data. The various kinds of data here may include a pen pressure value indicative of the pressure applied to a pen tip of the active pen P, on-off information indicative of a switch being on or off on a housing of the active pen P, and a pen identifier (ID) stored in the active pen P. The sensor controller 2 may preferably be configured to transmit an uplink signal to the active pen P. In this case, the uplink signal serves to designate the timing of transmitting the pen signal to the active pen P as well as to transmit commands to the active pen P.

The electronic equipment 1 has a panel plane 1a as a flat surface. In the description that follows, a normal direction to the panel plane 1a will be referred to as a z direction, a direction within the panel plane 1a perpendicular to the z direction as an x direction, and a direction within the panel plane 1a perpendicular to the x direction as a y direction. A user operates the active pen P on the panel plane 1a for pen input, or traces the panel plane 1a with fingers for finger touch input.

The sensor controller 2 is an integrated circuit that uses the pen sensor 5 to derive the position inside the panel plane 1a pointed to by an indicator body such as the active pen P or the user's finger and receive the data transmitted from the active pen P. The position of the active pen P is derived and the data transmitted from the active pen P is received by the active capacitance method, and the finger position is derived by the capacitance method. The sensor controller 2 is configured to sequentially output, to the host processor 3, the derived position and the data received from the active pen P.

The host processor 3 is a processor that controls the electronic equipment 1 as a whole. Operations of the components of the electronic equipment 1 are carried out under control of the host processor 3. The host processor 3 serves to generate digital ink and perform its rendering on the basis of the position and data input from the sensor controller 2. The host processor 3 also serves to generate a video signal for display on the display device 4 and to supply the generated signal thereto. The video signal generated by the host processor 3 can include the result of rendering of the digital ink.

The display device 4 is a device that performs a display operation on the basis of the video signal supplied from the host processor 3. For example, a liquid crystal display or an organic electroluminescent (EL) display may be suitably used as the display device 4, which is not limited to any specific type. Inside the display device 4 are a plurality of pixel electrodes disposed for each of pixels arranged in a matric pattern and a common electrode provided in common for each pixel.

The cover film 6 is a transparent membranous member that covers the top surface of the pen sensor 5 for protection and serves to form the flat panel plane 1a. The cover film 6 and the pen sensor 5 are bonded to each other by a transparent bonding layer interposed therebetween.

The pen sensor 5 includes a plurality of sensor electrodes arranged on the top surface of the display device 4. Each sensor electrode is disconnected electrically from the pixel electrodes and common electrode making up the display device 4. This type of electronic equipment 1 is called the on-cell type or out-cell type. Some of the sensor electrodes (e.g., a plurality of sensor electrodes 5a, to be discussed later) may double as the common electrode for the display device 4. The electronic equipment 1 in this case is called the in-cell type.

Figure 1B:
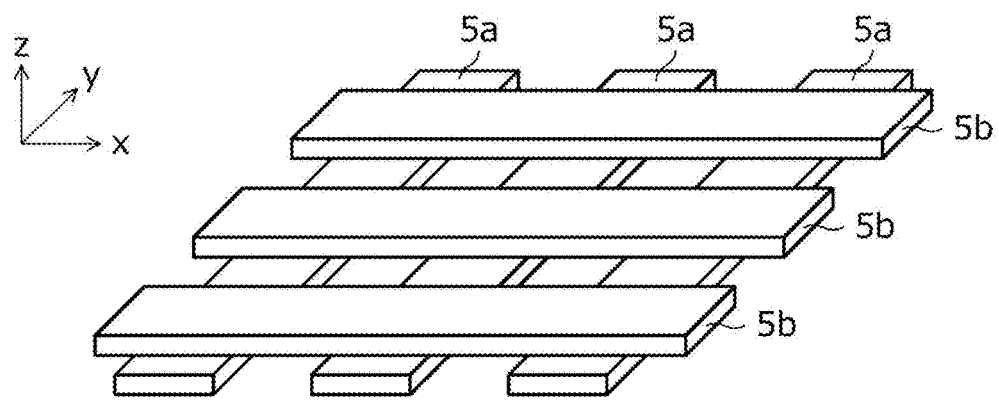
FIG. 1B is a schematic view of a structure of a pen sensor.

FIG. 1B is a schematic view depicting a structure of the pen sensor 5. As depicted in FIG. 1B, the pen sensor 5 has a two-layer structure made up of a first layer including a plurality of sensor electrodes 5a (first sensor electrodes) and a second layer including a plurality of sensor electrodes 5b (second sensor electrodes). The plurality of sensor electrodes 5a in the first layer extend in the y direction each and are arranged in parallel with one another in the x direction. Meanwhile, the plurality of sensor electrodes 5b in the second layer extend in the x direction each and are arranged in parallel with one another in the y direction. The plurality of sensor electrodes 5a and 5b are each connected electrically to the sensor controller 2 by unillustrated lead-out wiring.

Preferably, the sensor electrodes 5a and 5b may be formed by plate-like conductors such as those depicted in FIG. 1B. Alternatively, the sensor electrodes 5a and 5b may be formed by mesh conductors, which are each an aggregate of fine linear conductors. The first embodiment uses the example of the sensor electrodes 5a and 5b being formed by plate-like conductors. A second and a third embodiment, to be discussed later, will use the example of the sensor electrodes 5a and 5b being constituted by mesh conductors. As a constituent material for the sensor electrodes 5a and 5b to be formed by plate-like conductors, a transparent conductor such as indium tin oxide (ITO) is utilized to let the display surface of the display device 4 be seen through the pen sensor 5.

Figure 2A:
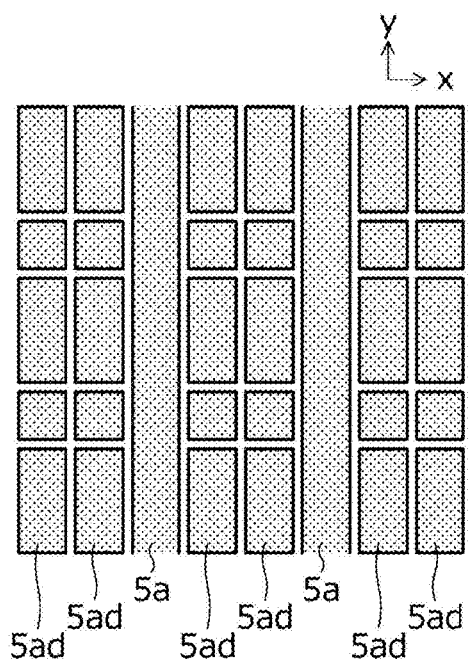
FIG. 2A is a plan view of a first layer of the pen sensor according to the first embodiment.
Figure 2B:
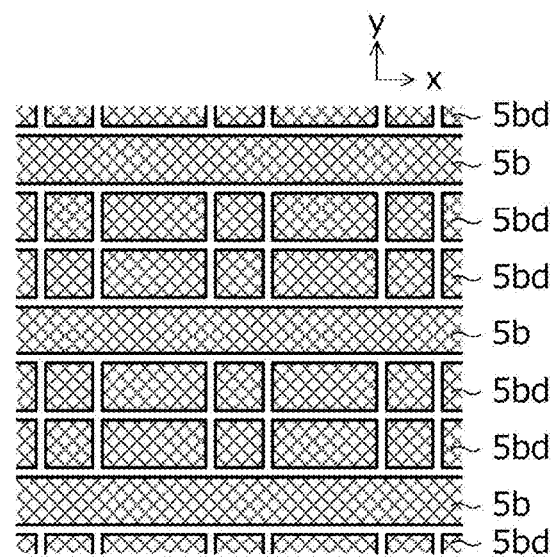
FIG. 2B is a plan view of a second layer of the pen sensor according to the first embodiment.

FIG. 2A is a plan view of the first layer of the pen sensor 5 according to the first embodiment. As depicted in FIG. 2A, the first layer of the pen sensor 5 incorporates, in addition to the sensor electrodes 5a indicated in FIG. 1B, a plurality of conductor patterns (first conductor patterns) including a plurality of dummy patterns 5ad (first dummy patterns). FIG. 2B is a plan view of the second layer of the pen sensor 5 according to the first embodiment. As depicted in FIG. 2B, the second layer of the pen sensor 5 incorporates, in addition to the sensor electrodes 5b illustrated in FIG. 1B, a plurality of conductor patterns (second conductor patterns) including a plurality of dummy patterns 5bd (second dummy patterns). The dummy patterns 5ad and 5bd are conductors which are formed by the same material as that of the sensor electrodes 5a and 5b, constitute floating conductors insulated from the other conductors in the same layers, and are not connected to the sensor controller 2.

The basic shape of the plurality of dummy patterns 5ad is a square with each side having the length the same as the width of the sensor electrodes 5a. In the first layer, in principle, the square dummy patterns 5*ad* are arranged to cover regions between every two adjacent sensor electrodes 5*a* with a tiny gap left therebetween. The same also applies to the plurality of dummy patterns 5*bd* of which the basic shape is also a square with each side having the length the same as the width of the sensor electrodes 5*b*. In the second layer, in principle, the square dummy patterns 5*bd* are also arranged to cover regions between every two adjacent sensor electrodes 5*b* with a tiny gap left therebetween.

Here, as depicted in FIGS. 2A and 2B, some of the dummy patterns 5*ad* and 5*bd* are each formed not as a square but as a rectangle. The formation is designed to let the dummy patterns 5*ad* and 5*bd* step over the sensor electrodes 5*b* and 5*a* in order to prevent absorption of the pen signal by the sensor electrodes 5*a* and 5*b* and propagate the pen signal as far as possible. This point will be discussed later in more detail.

Figure 3A:
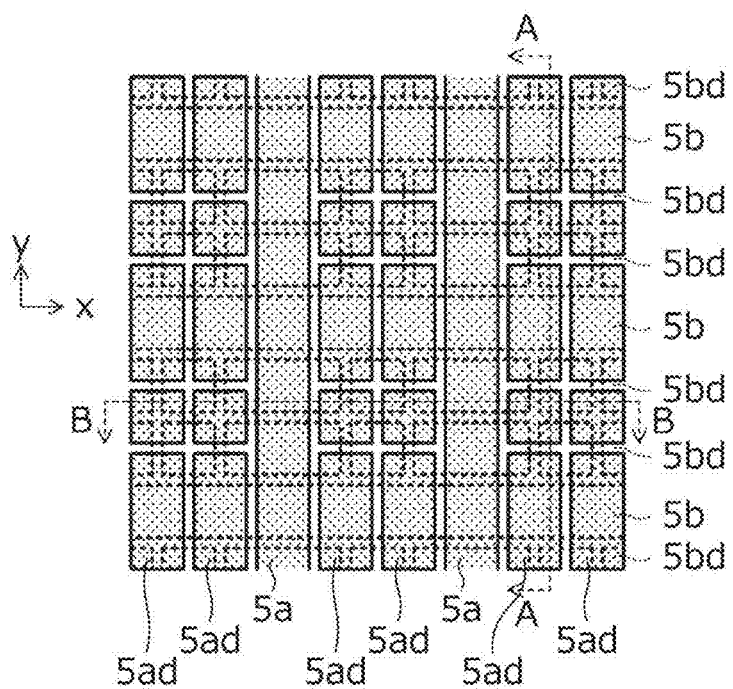
FIG. 3A is a plan view of the first and second layers of the pen sensor being overlaid with one another according to the first embodiment.
Figure 3B:
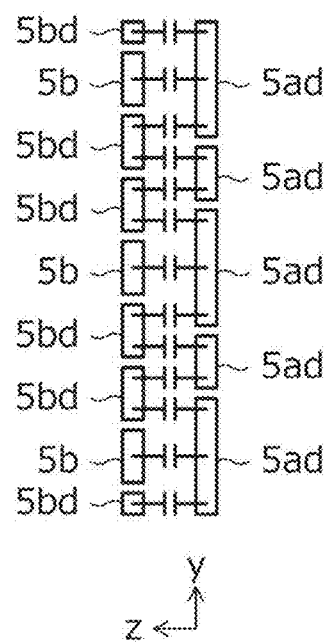
FIG. 3B is a cross-sectional view of the pen sensor taken on line A-A in FIG. 3A.
Figure 3C:
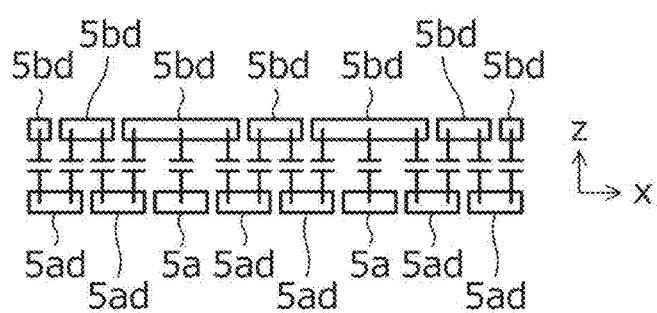
FIG. 3C is a cross-sectional view of the pen sensor taken on line B-B in FIG. 3A.

FIG. 3A is a plan view of the first and second layers of the pen sensor 5 being overlaid with one another according to the first embodiment. FIG. 3A indicates, by broken lines, the sensor electrodes 5*b* and dummy patterns 5*bd* positioned above, such that the overlaid state of the sensor electrodes and the dummy patterns in each of the layers is well understood. FIG. 3B is a cross-sectional view of the pen sensor 5 taken on line A-A in FIG. 3A. FIG. 3C is a cross-sectional view of the pen sensor 5 taken on line B-B in FIG. 3A.

As depicted in FIGS. 3A through 3C, the plurality of dummy patterns 5*ad* are each arranged to be overlaid with at least one of the plurality of dummy patterns 5*bd* when viewed from above. Some of the dummy patterns 5*ad* are arranged to be overlaid with one of the plurality of sensor electrodes 5*b* when viewed from above. Some of the dummy patterns 5*bd* are arranged to be overlaid with one of the plurality of sensor electrodes 5*a* when viewed from above. Between the conductor patterns overlaid with one another when viewed from above (between the sensor electrodes, between the sensor electrodes and the dummy patterns, and between the dummy patterns; the same applies hereunder), capacitive coupling generates capacitance as indicated in FIGS. 3B and 3C. Specific arrangements of the sensor electrodes 5*a* and 5*b* and those of the dummy patterns 5*ad* and 5*bd* are determined in such a manner that the pen signal transmitted from the active pen P propagates in a planar direction (x direction and y direction) via the generated capacitance.

The above arrangements of the sensor electrodes 5*a* and 5*b* and those of the dummy patterns 5*ad* and 5*bd* allow the pen signal from the active pen P to propagate from the central sensor electrode positioned directly under the pen tip electrode of the active pen P to the peripheral sensor electrodes around the central sensor electrode via the capacitance generated between the conductor patterns overlaid with one another when viewed from above. This point is discussed below in more detail with reference to FIG. 4.

Figure 4:
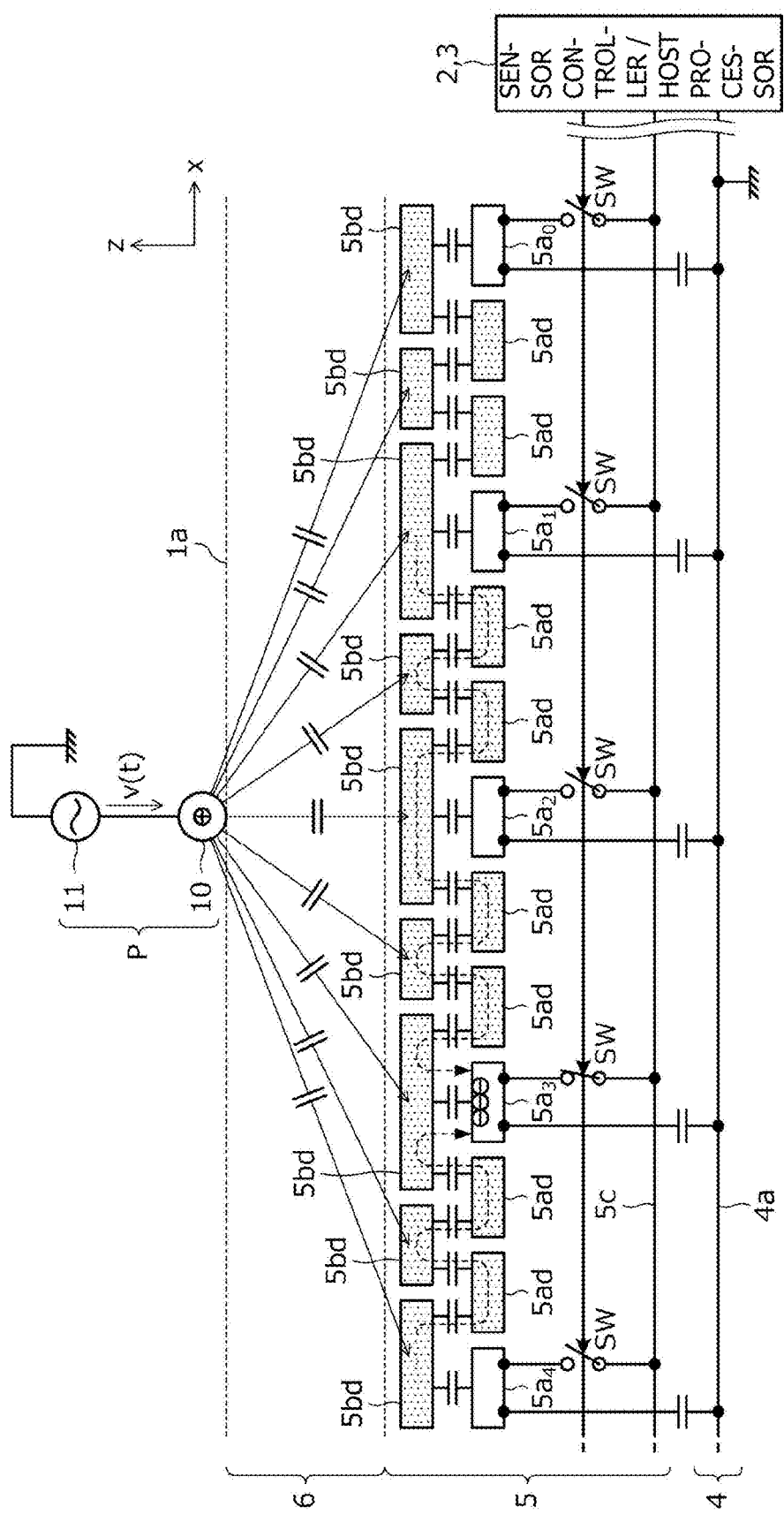
FIG. 4 is a view depicting how a pen signal propagates in the pen sensor according to the first embodiment.

FIG. 4 is a view depicting how the pen signal propagates in the pen sensor 5. FIG. 4 depicts the case where an x coordinate of the active pen P is detected using the plurality of sensor electrodes 5*a*. The same applies to the case where a y coordinate of the active pen P is detected using the plurality of sensor electrodes 5*b*.

Switch elements SW in FIG. 4 are each an element that controls the connection state between each of the plurality of sensor electrodes 5*a* and a common line 5*c* connected to the sensor controller 2. The switch elements SW are controlled individually by the sensor controller 2. FIG. 4 indicates the case in which, of five illustrated sensor electrodes $5a_0$ through $5a_4$, the sensor electrode $5a_3$ corresponds to a switch element SW that is turned on, with the other switch elements SW turned off. In this case, only the sensor electrodes $5a_3$ among the five sensor electrodes $5a_0$ through $5a_4$ is connected to the sensor controller 2. Although not depicted, similar switch elements SW are provided for each of the plurality of sensor electrodes 5*b*.

A conductor 4*a* in FIG. 4 is representative of the conductors such as the pixel electrodes and common electrode included in the display device 4. The capacitance arranged between each sensor electrode 5*a* and the conductor 4*a* represents parasitic capacitance generated between the sensor electrodes 5*a* and the conductor 4*a*.

As depicted in FIG. 4, the active pen P includes a pen tip electrode 10 at the pen tip and an oscillation circuit 11. The oscillation circuit 11 serves to transmit the pen signal from the pen tip electrode 10 by supplying an alternating-current voltage v(t) thereto. The pen signal transmitted from the pen tip electrode 10 generates electrical charges between each sensor electrode 5*b* and each dummy pattern 5*bd* via the capacitance generated between the pen tip electrode 10 on one hand and each sensor electrode 5*b* and each dummy pattern 5*bd* on the other hand.

FIG. 4 indicates the case where the pen tip electrode 10 is positioned directly above the sensor electrode $5a_2$. In the example of FIG. 4, as described above, only the sensor electrode $5a_3$ among the five sensor electrodes $5a_0$ through $5a_4$ is connected to the sensor controller 2. In this case, the electrical charges generated by the pen signal in each sensor electrode 5*b* and each dummy pattern 5*bd* are collected to the sensor electrode $5a_3$ via the capacitance generated, as indicated by broken lines, between the conductor patterns overlaid with one another when viewed from above. As a result, a current flows from the sensor electrode $5a_3$ to the sensor controller 2. The current is received by the sensor controller 2 as the pen signal.

The shorter the distance between a given sensor electrode 5*a* connected to the sensor controller 2 and the pen tip electrode 10, the larger the volume of electrical charges collected to that sensor electrode 5*a*. Consequently, the closer a given sensor electrode 5*a* is to the pen tip electrode 10, the larger the amplitude of the pen signal received from that sensor electrode 5*a* by the sensor controller 2. The same also applies to the sensor electrodes 5*b*. The sensor controller 2 acquires a distribution of the amplitudes of the pen signal received from the sensor electrodes 5*a* and 5*b*, to derive an approximate curve of the distribution. The sensor controller 2 then derives coordinates of the apex of the curve as the position of the active pen P.

In this manner, the pen sensor 5 according to the first embodiment causes the electrical charges generated by the pen signal in the sensor electrodes 5*a* and the dummy patterns 5*bd* to be collected to the sensor electrodes 5*a* and 5*b* connected to the sensor controller 2, via the capacitance generated between the conductor patterns overlaid with one another when viewed from above. Compared with the case where such capacitance is absent, the first embodiment can enlarge the amplitude of the pen signal in the sensor electrodes 5*a* and 5*b* acting as the peripheral sensor electrodes. This makes it possible for the peripheral sensor electrodes to fully receive the pen signal while avoiding increasing costs and reduced transmittance incurred by disposing a conductive cover film 6.

Moreover, the pen sensor 5 according to the first embodiment has the dummy patterns 5*ad* formed in a manner stepping over the sensor electrodes 5*b* (i.e., as rectangles) in a position where the dummy patterns 5*ad* and the sensor electrodes 5*b* are overlaid with one another when viewed from above. The pen sensor 5 also has the dummy patterns 5*bd* formed in a manner stepping over the sensor electrodes 5*a* (i.e., as rectangles) in a position where the dummy patterns 5*bd* and the sensor electrodes 5*a* are overlaid with one another when viewed from above. The formation permits efficient collection of the electrical charges to the sensor electrodes 5*a* and 5*b* connected to the sensor controller 2.

To elaborate on this point, the sensor electrodes 5*a* and 5*b* are formed larger than the dummy patterns 5*ad* and 5*bd* and thus have larger self-capacitance. The electrical charges flowing into the sensor electrodes 5*a* and 5*b* disconnected from the sensor controller 2 end up being accumulated in the sensor electrodes 5*a* and 5*b*. According to the first embodiment, by contrast, the dummy patterns 5*ad* and 5*bd* are formed to step over the sensor electrodes 5*a* and 5*b* as discussed above. This makes it possible to reduce the volume of electrical charges flowing into the sensor electrodes 5*a* and 5*b* disconnected from the sensor controller 2 and to have the electrical charges efficiently collected to the sensor electrodes 5*a* and 5*b* connected to the sensor controller 2.

As described above, the pen sensor 5 according to the first embodiment is configured to let the peripheral sensor electrodes fully receive the pen signal while avoiding increasing costs and reduced transmittance. The pen sensor 5 further allows the electrical charges to be efficiently collected to the sensor electrodes 5*a* and 5*b* connected to the sensor controller 2.

In addition, the pen sensor 5 according to the first embodiment has its first and second layers equipped almost entirely with the sensor electrodes or the dummy patterns. This provides the benefit of ensuring a uniform transmittance and a constant reception sensitivity for the pen signal over the entire surface of the panel plane 1*a*. This point is further explained below in comparison with the shapes of the sensor electrodes according to the related art of the present disclosure.

Figure 5C:
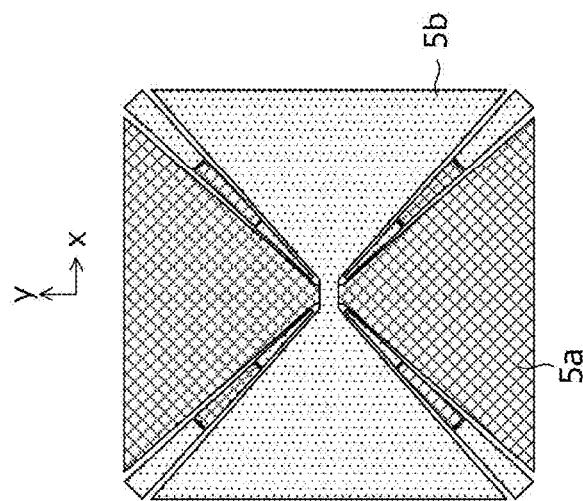
FIG. 5C is a plan view of the first and second layers of the pen sensor being overlaid with each other according to the related art.
Figure 5B:
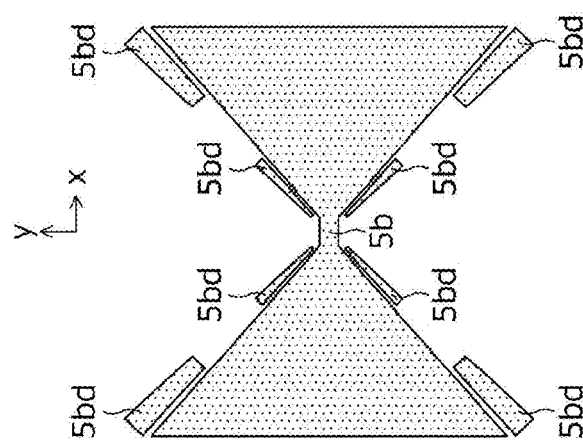
FIG. 5B is a plan view of a second layer of the pen sensor according to the related art.
Figure 5A:
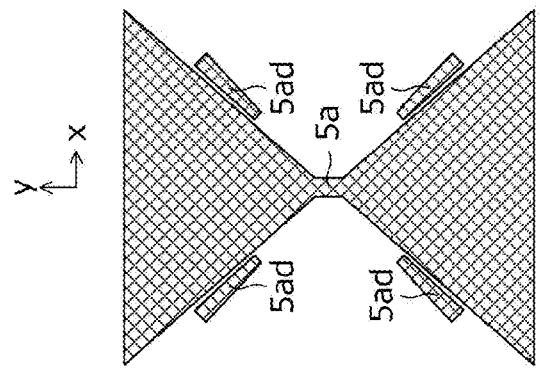
FIG. 5A is a plan view of a first layer of a pen sensor according to the related art of the present disclosure.

FIG. 5A is a plan view of a first layer of a pen sensor according to the related art of the present disclosure. FIG. 5B is a plan view of a second layer of the pen sensor according to the related art. FIG. 5C is a plan view of the first and second layers of the pen sensor being overlaid with one another according to the related art. As will be understood from these drawings, in the pen sensor according to the related art, the sensor electrodes 5*a* and 5*b* are each shaped to be like an hourglass, the electrodes intersecting with each other at their narrowest portions. The purpose of the pen sensor of the related art adopting this electrode shape is to minimize the dimensions of the area where the sensor electrodes 5*a* and 5*b* are overlaid with each other when viewed from above, while preventing the direct-current resistance of the sensor electrodes 5*a* and 5*b* from becoming inordinately large.

The dummy patterns 5*ad* and 5*bd* are disposed in a tiny gap between the sensor electrodes 5*a* and 5*b* in a manner avoiding overlaying with the conductor patterns in the other layer, when viewed from above. The absence of overlaying with the conductor patterns in the other layer negates the function of pen signal propagation of the dummy patterns 5*ad* and 5*bd* according to the related art.

The above-described pen sensor according to the related art of the present disclosure ensures relatively high transmittance equivalent to that of a single conductor pattern over the almost entire area of the panel plane 1*a*. Meanwhile, only the region where the sensor electrodes 5*a* and 5*b* are overlaid with each other has relatively low transmittance equivalent to that of two conductor patterns. That region can thus be perceived as a dark spot by the user. Further, uneven widths of the sensor electrodes 5*a* and 5*b* may vary the reception sensitivity for the pen signal depending on their location.

In the pen sensor 5 according to the first embodiment, by contrast, the sensor electrodes 5*a* or the dummy patterns 5*ad* in the first layer and the sensor electrodes 5*b* or the dummy patterns 5*bd* in the second layer are overlaid with one another over the entire surface. This ensures uniform transmittance over the entire surface of the panel plane 1*a*, thereby avoiding the user perceiving the dark spot. A uniform width of the sensor electrodes 5*a* and 5*b* makes it possible to maintain a constant reception sensitivity for the pen signal over the entire surface of the panel plane 1*a*.

The electronic equipment 1 according to a second embodiment of the present disclosure is explained next. The electronic equipment 1 according to the second embodiment differs from the electronic equipment 1 according to the first embodiment in that the sensor electrodes 5*a* and 5*b* and the dummy patterns 5*ad* and 5*bd* are formed by mesh conductors of a substantially square shape each. The other points are similar to the corresponding points of the electronic equipment 1 according to the first embodiment. The description that follows will thus focus on the differences of the electronic equipment 1 between the second embodiment and the first embodiment.

Figure 6B:
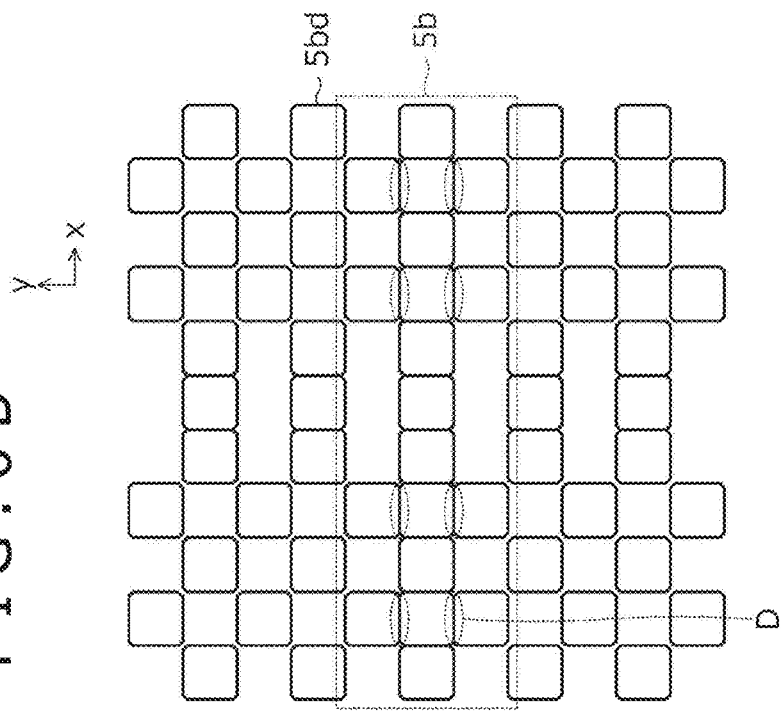
FIG. 6B is a plan view of a second layer of the pen sensor according to the second embodiment.
Figure 6A:
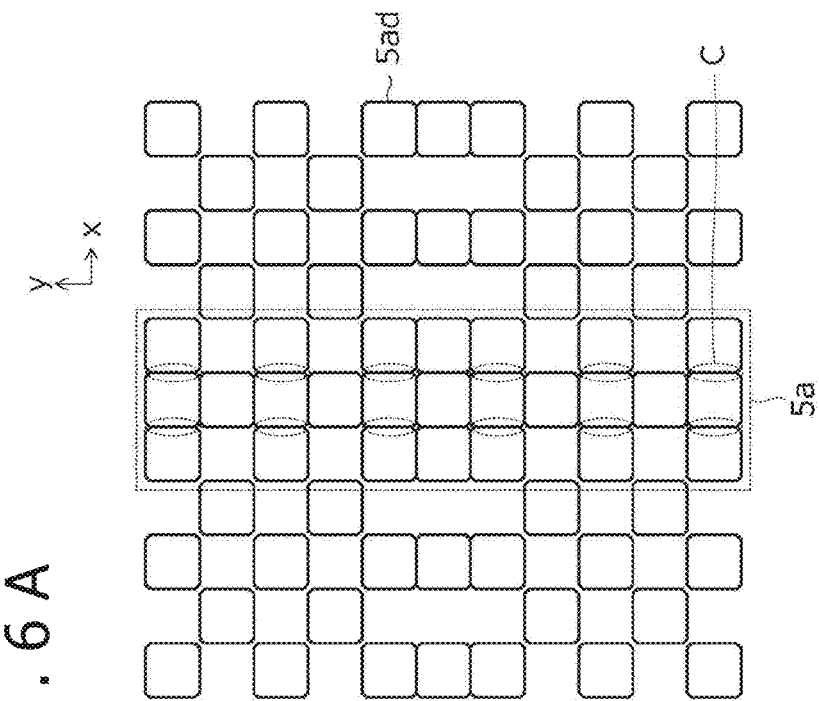
FIG. 6A is a plan view of a first layer of a pen sensor according to a second embodiment of the present disclosure.

FIG. 6A is a plan view of a first layer of a pen sensor 5 according to the second embodiment of the present disclosure. FIG. 6B is a plan view of a second layer of the pen sensor 5 according to the second embodiment. A plurality of approximate squares (squares without corners, to be more precise) in these drawings are mesh conductors each formed by fine linear conductors arranged along its sides. They make up the sensor electrodes 5*a* and 5*b* or the dummy patterns 5*ad* and 5*bd*. The center part of each mesh conductor (i.e., the area surrounded by the sides of the approximate square) is a hollow space, i.e., an area where no conductor is formed. Each mesh conductor is provided for each pixel of the display device 4 and is arranged in such a manner that a light-emitting part of a corresponding one of the pixels is positioned at the center of the mesh conductor when viewed from above. The arrangement allows each mesh conductor to let the light from the display device 4 pass through.

Each mesh conductor is made devoid of corners such that two mesh conductors obliquely adjacent to each other will not come into electrical contact. In contrast, two mesh conductors adjacent to each other in the x or y direction share the side therebetween and are thereby integrated physically and electrically. Taking advantage of these features of the mesh conductors, the pen sensor 5 has the sensor electrodes 5*a* formed by a series of mesh conductors arranged with no gap therebetween in the y direction and by a plurality of mesh conductors arranged in the x direction adjacent to a portion of the series of mesh conductors, and has the sensor electrodes 5*b* formed by a series of mesh conductors arranged with no gap therebetween in the x direction and by a plurality of mesh conductors arranged in the y direction adjacent to a portion of the series of mesh conductors. The pen sensor 5 also has the dummy patterns 5*ad* and 5*bd* formed by a plurality of mesh conductors arranged obliquely adjacent to each other in a grid-like pattern. It is to be noted that, in the position of overlaying with the sensor electrodes 5*b* and 5*a* when viewed from above, the dummy patterns 5*ad* and 5*bd* are formed using three mesh conductors adjacent to each other in a row in the x or y direction. This is the same formation as that of the first embodiment in which some dummy patterns 5*ad* and 5*bd* are formed of rectangles.

In a case where the linear conductors making up each side of the mesh conductors are formed in the same position in the first and second layers when viewed from above, capacitance is generated between the linear conductors due to capacitive coupling. A region C indicated by a broken-line ellipse in FIG. 6A is a portion where the linear conductors forming the sensor electrodes 5*a* are not overlaid with the linear conductors in the second layer when viewed from above. In the other portions, the linear conductors forming the sensor electrodes 5*a* generate capacitance relative to the linear conductors in the second layer. Likewise, a region D indicated by a broken-line ellipse in FIG. 6B is a portion where the linear conductors forming the sensor electrodes 5*b* are not overlaid with the linear conductors in the first layer when viewed from above. In the other portions, the linear conductors forming the sensor electrodes 5*b* generate capacitance relative to the linear conductors in the first layer.

Figure 7A:
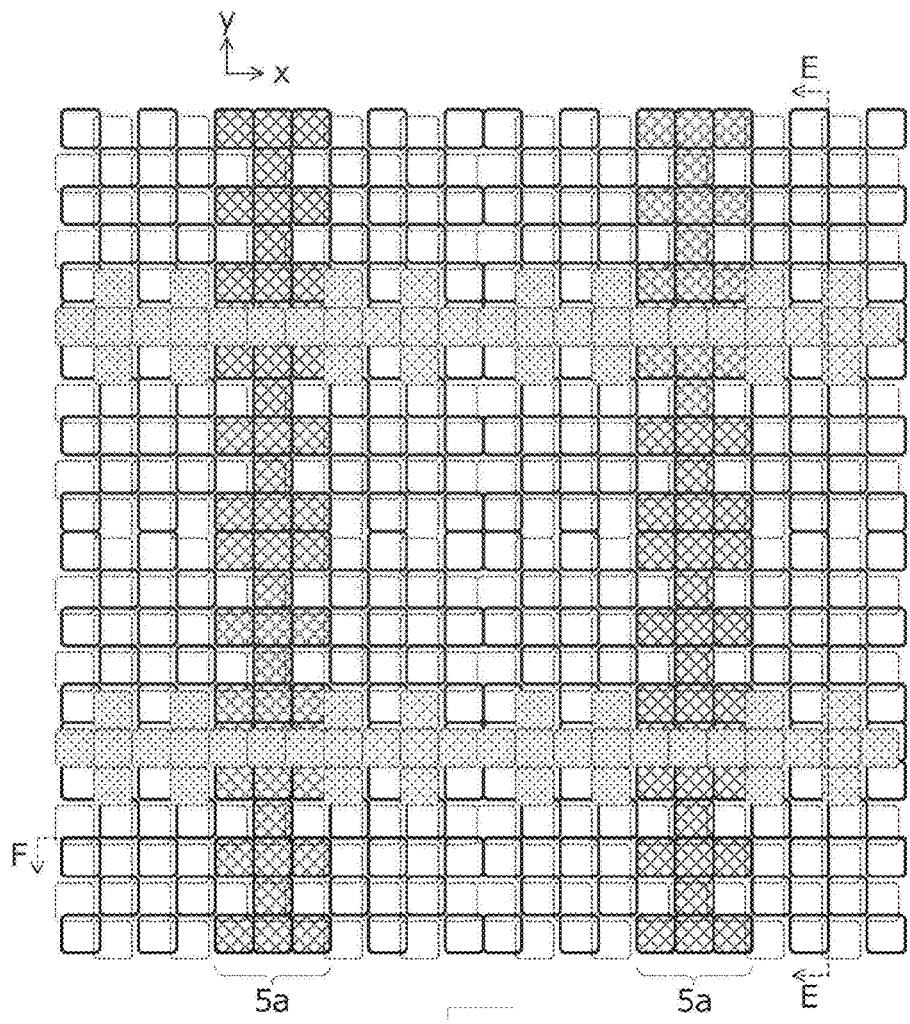
FIG. 7A is a plan view of the first and second layers of the pen sensor being overlaid with one another according to the second embodiment.
Figure 7B:
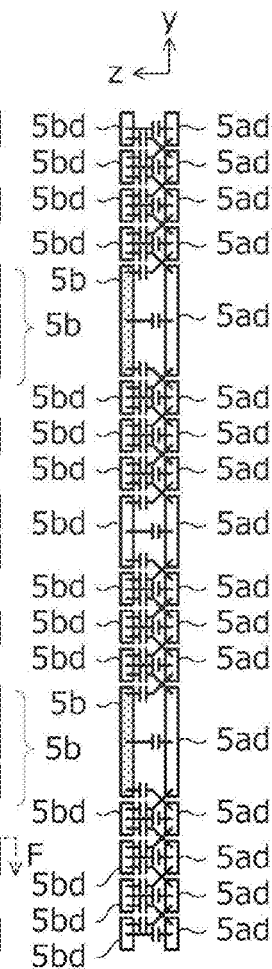
FIG. 7B is a cross-sectional view of the pen sensor taken on line E-E in FIG. 7A.
Figure 7C:
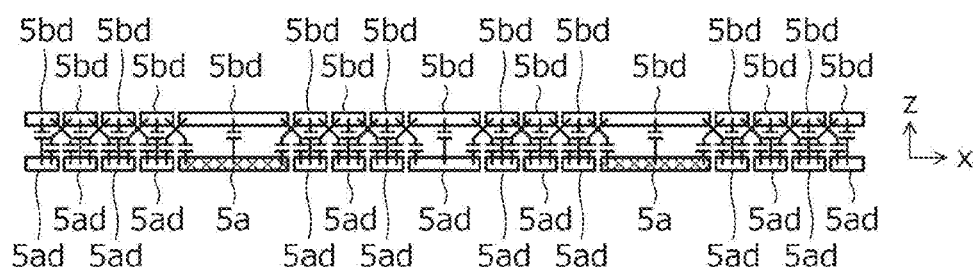
FIG. 7C is a cross-sectional view of the pen sensor taken on line F-F in FIG. 7A.

FIG. 7A is a plan view of the first and second layers of the pen sensor 5 being overlaid with one another according to the second embodiment. In FIG. 7A, the sensor electrodes 5*b* and the dummy patterns 5*bd* in the second layer positioned above are indicated by broken lines, with the second layer rendered slightly shifted relative to the first layer, in order to ensure understanding of the overlaid state of the sensor electrode and the dummy patterns in each of the layers. The mesh conductors corresponding to the sensor electrodes 5*a* and 5*b* are drawn hatched inside. The hatching is intended to let the positions of the sensor electrodes 5*a* and 5*b* be well understood; it does not mean that the inside of the mesh conductors acts as a conductor. FIG. 7B is a cross-sectional view of the pen sensor 5 taken on line E-E in FIG. 7A. FIG. 7C is a cross-sectional view of the pen sensor 5 taken on line F-F in FIG. 7A.

In the second embodiment, as depicted in FIGS. 7A through 7C, the plurality of dummy patterns 5*bd* are also each arranged to be overlaid with at least one of the plurality of dummy patterns 5*bd* when viewed from above. Some of the dummy patterns 5*ad* are arranged to be overlaid with one of the plurality of sensor electrodes 5*b* when viewed from above. Some of the dummy patterns 5*bd* are arranged to be overlaid with one of the plurality of sensor electrodes 5*a* when viewed from above. As in the first embodiment, between the conductor patterns overlaid with one another when viewed from above, capacitive coupling generates capacitance. Specific arrangements of the sensor electrodes 5*a* and 5*b* and those of the dummy patterns 5*ad* and 5*bd* are determined in such a manner that the pen signal transmitted from the active pen P propagates in the planar direction (x and y directions) via the generated capacitance. In FIG. 7B, capacitance is generated between the conductor patterns that are apparently not directly overlaid with one another. That is because the conductor patterns are overlaid with each other along the sides extending in the x direction. The same applies to FIG. 7C as well.

In the pen sensor 5 according to the second embodiment, as in the pen sensor 5 according to the first embodiment, the above configuration allows the pen signal from the active pen P to propagate from the central sensor electrode positioned directly under the pen tip electrode of the active pen P to the peripheral sensor electrodes around the central sensor electrode. This makes it possible for the pen sensor 5 of the second embodiment to let the peripheral sensor electrodes fully receive the pen signal while avoiding increasing costs and reduced transmittance.

Further, as with the pen sensor 5 according to the first embodiment, the pen sensor 5 according to the second embodiment has the dummy patterns 5*ad* formed in a manner stepping over the sensor electrodes 5*b* (i.e., by making three mesh conductors made contiguous in the y direction) in the position where the dummy patterns 5*ad* and the sensor electrodes 5*b* are overlaid with one another when viewed from above, and has the dummy patterns 5*bd* formed in a manner stepping over the sensor electrodes 5*a* (i.e., by making three mesh conductors contiguous in the x direction) in the position where the dummy patterns 5*bd* and the sensor electrodes 5*a* are overlaid with one another when viewed from above. This provides the benefit of efficiently collecting electrical charges to the sensor electrodes 5*a* and 5*b* connected to the sensor controller 2, as in the case of the pen sensor 5 according to the first embodiment.

The electronic equipment 1 according to a third embodiment of the present disclosure is explained next. The electronic equipment 1 according to the third embodiment differs from the electronic equipment 1 according to the second embodiment in that the specific shapes of the mesh conductors forming the sensor electrodes 5*a* and 5*b* and the dummy patterns 5*ad* and 5*bd* are different from those of the electronic equipment 1 according to the second embodiment. The other points are similar to the corresponding points in the electronic equipment 1 according to the second embodiment. The description that follows will thus focus on the differences of the electronic equipment 1 between the third embodiment and the second embodiment.

Figure 8B:
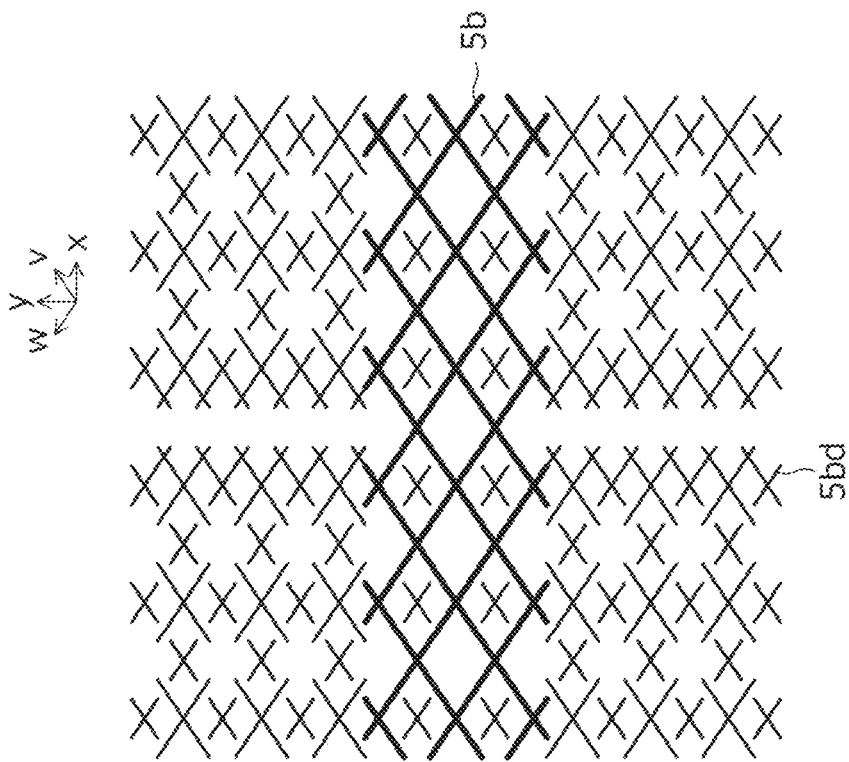
FIG. 8B is a plan view of a second layer of the pen sensor according to the third embodiment.
Figure 8A:
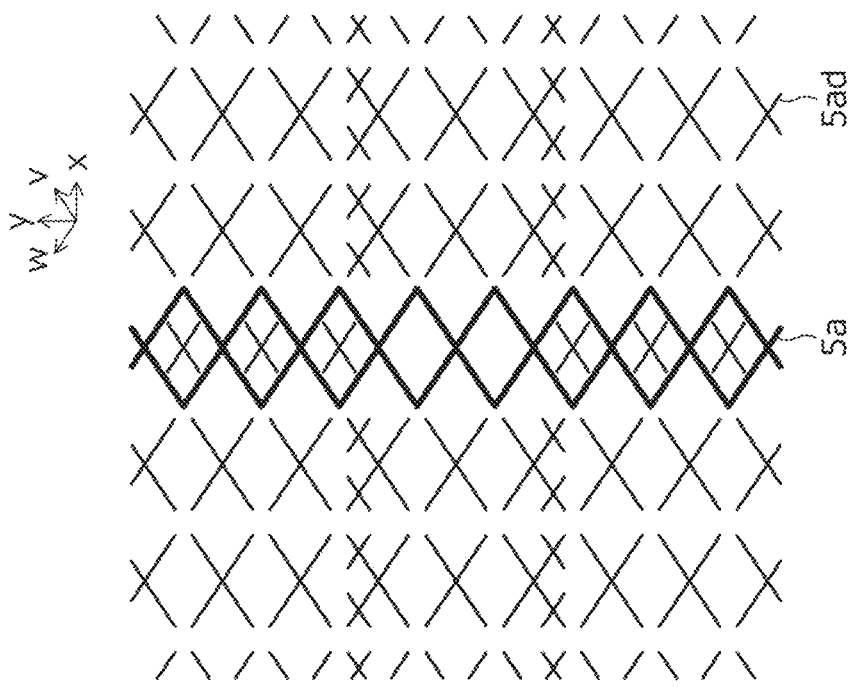
FIG. 8A is a plan view of a first layer of a pen sensor according to a third embodiment of the present disclosure.

FIG. 8A is a plan view of a first layer of a pen sensor 5 according to the third embodiment of the present disclosure. FIG. 8B is a plan view of a second layer of the pen sensor 5 according to the third embodiment. As depicted in these drawings, the mesh conductors of the third embodiment are formed by linear conductors in parallel with two directions (v and w directions indicated) that are oblique to each of the x and y directions. Combining these linear conductors forms the dummy patterns 5*ad* and 5*bd* in an X shape or in a combination of Xs, and forms the sensor electrodes 5*a* and 5*b* in a series of lozenges. The dummy patterns 5*ad* and 5*bd* in the X shape are also arranged within some of the lozenges making up the sensor electrodes 5*a* and 5*b*. Although FIGS. 8A and 8B indicate, by thick lines, only the linear conductors forming the sensor electrodes 5*a* and 5*b*, in order to facilitate understanding of their structure, the line width of the linear conductors making up the sensor electrodes 5*a* and 5*b* may be the same as the line width of the linear conductors making up the dummy patterns 5*ad* and 5*bd* in practice.

Figure 9:
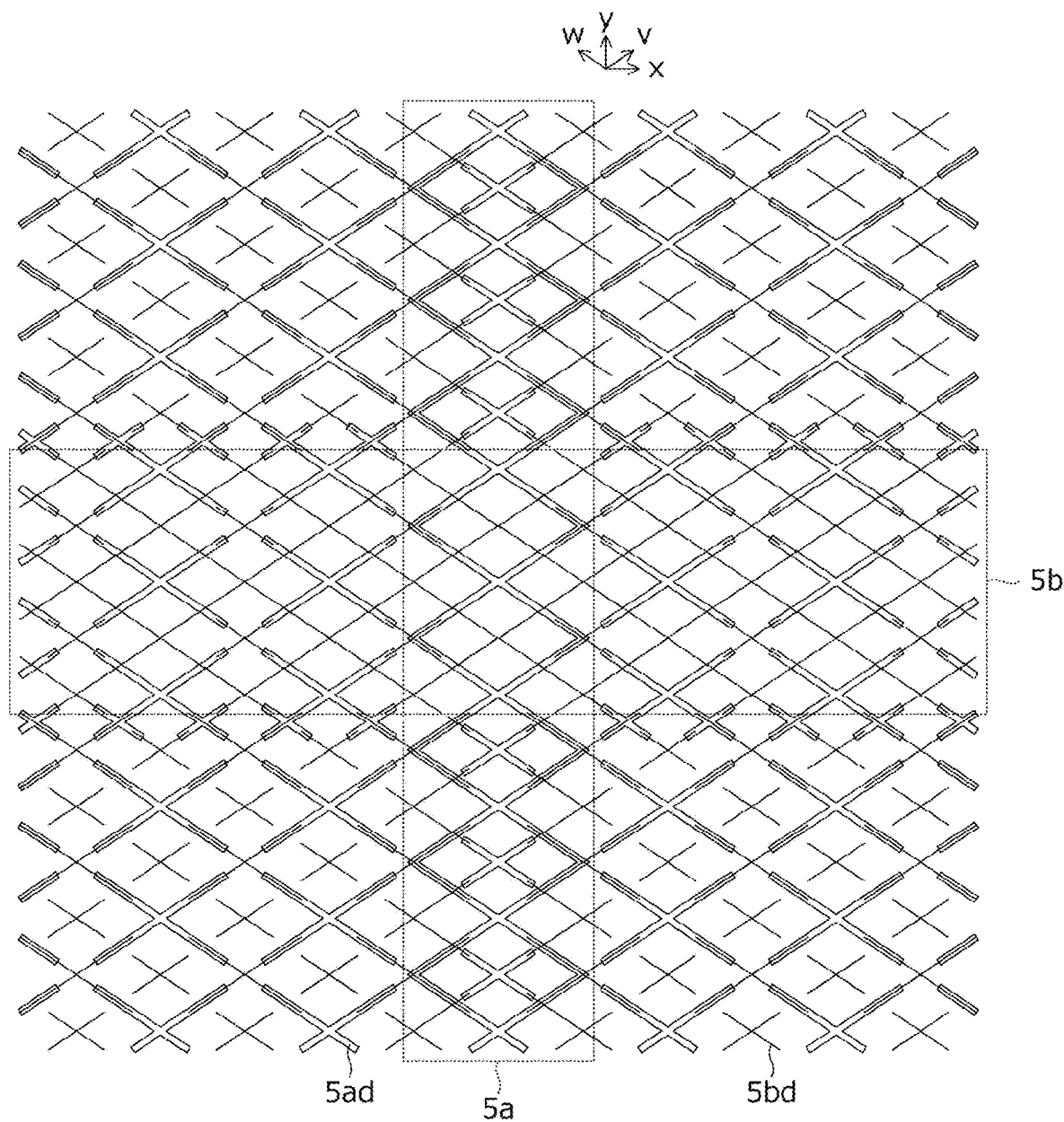
FIG. 9 is a plan view of the first and second layers of the pen sensor being overlaid with each other according to the third embodiment.

FIG. 9 is a plan view of the first and second layers of the pen sensor 5 being overlaid with one another according to the third embodiment. In this drawing, the sensor electrodes 5*a* and the dummy patterns 5*ad* in the first layer positioned below are indicated by hollow lines, in order to ensure understanding of the overlaid state of the sensor electrodes and the dummy patterns in the layers.

According to the third embodiment, as depicted in FIG. 9, the plurality of dummy patterns 5*ad* are each arranged to be overlaid with at least one of the plurality of dummy patterns 5*bd* when viewed from above. Some of the dummy patterns 5*ad* are arranged to be overlaid with one of the plurality of sensor electrodes 5*b* when viewed from above. Some of the dummy patterns 5*bd* are arranged to be overlaid with one of the plurality of sensor electrodes 5*a* when viewed from above. As in the second embodiment, between the conductor patterns overlaid with one another when viewed from above, capacitance is generated. Specific arrangements of the sensor electrodes 5*a* and 5*b* and those of the dummy patterns 5*ad* and 5*bd* are determined in such a manner that the pen signal transmitted from the active pen P propagates in the planar direction (x and y directions) via the generated capacitance. Thus, the pen sensor 5 according to the third embodiment also allows the peripheral sensor electrodes to fully receive the pen signal while avoiding increasing costs and reduced transmittance.

Also, in the pen sensor 5 according to the third embodiment, the dummy patterns 5*ad* are arranged within some of the lozenges making up the sensor electrodes 5*a*. By way of these dummy patterns 5*ad*, the dummy patterns 5*bd* positioned on both sides of the sensor electrodes 5*a* in the x direction are electrically connected to each other. Likewise, the dummy patterns 5*bd* are arranged within some of the lozenges making up the sensor electrodes 5*b*. By way of these dummy patterns 5*bd*, the dummy patterns 5*ad* positioned on both sides of the sensor electrodes 5*b* in the y direction are electrically connected to each other. Consequently, as in the pen sensor 5 according to the second embodiment, the dummy patterns are formed in a manner stepping over the sensor electrodes 5*b* in the position where the dummy patterns 5*ad* and the sensor electrodes 5*b* are overlaid with one another when viewed from above, and the dummy patterns are formed in a manner stepping over the sensor electrodes 5*a* in the position where the dummy patterns 5*bd* and the sensor electrodes 5*a* are overlaid with one another when viewed from above. This formation allows the pen sensor 5 of the third embodiment to provide the benefit of efficiently collecting electrical charges to the sensor electrodes 5*a* and 5*b* connected to the sensor controller 2.

The present disclosure is not limited to the preferred embodiments discussed above and may obviously be implemented in diverse variations so far as they are within the scope of the present disclosure.

For example, whereas each of the above-described embodiments has the conductor patterns in the first layer and those in the second layer connected with each other via the capacitance generated by capacitive coupling, these conductor patterns may alternatively be interconnected through via conductors. In this case, resistors of several hundred kilo-ohms (kΩ) should preferably be introduced between the conductor patterns in order to avoid the level difference of the pen signal becoming undetectable between the sensor electrodes.

In place of the dummy patterns provided in the first and second layers, a sheet may be disposed between the cover film 6 and the pen sensor 5, the sheet having high transmittance and including minute conductors in floating relation to each other. The minute conductors may be suitably formed by silver nanowires or by carbon nanotubes, for example. The sheet to be added should preferably be used in an insulated state in order to exclude resistance components, the sheet preferably being configured to let the pen signal propagate not via resistance but by means of capacitance components.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pen sensor for use in detecting an active pen, the pen sensor comprising:
    a first layer including a plurality of first sensor electrodes and a plurality of first dummy patterns; and
    a second layer including a plurality of second sensor electrodes and a plurality of second dummy patterns,
    wherein the first dummy patterns and the second dummy patterns are overlaid with each other when viewed from above the pen sensor, and
    wherein a pen signal transmitted from the active pen propagates in a planar direction by way of capacitance generated between the first dummy patterns and the second dummy patterns.

2. The pen sensor according to claim 1,
    wherein the first dummy patterns of the first layer are insulated from each other, and
    wherein the second dummy patterns of the second layer are insulated from each other.

3. A pen sensor for use in detecting an active pen, the pen sensor comprising:
    a first layer including a plurality of first sensor electrodes and a plurality of first dummy patterns; and
    a second layer including a plurality of second sensor electrodes and a plurality of second dummy patterns,
    wherein the first sensor electrodes and the second dummy patterns are overlaid with each other when viewed from above the pen sensor, and
    wherein a pen signal transmitted from the active pen propagates in a planar direction by way of capacitance generated between the first dummy patterns and the second dummy patterns.

4. The pen sensor according to claim 3,
    wherein the second sensor electrodes and the first dummy patterns are overlaid with each other when viewed from above.

5. The pen sensor according to claim 3,
    wherein the first dummy patterns of the first layer are insulated from each other, and
    wherein the second dummy patterns of the second layer are insulated from each other.

6. A pen sensor for use in detecting an active pen, the pen sensor comprising:
    a first layer including a plurality of first sensor electrodes and a plurality of first conductor patterns formed of a plurality of first dummy patterns; and
    a second layer including a plurality of second sensor electrodes and a plurality of second conductor patterns formed of a plurality of second dummy patterns,
    wherein the plurality of first conductor patterns and the plurality of second conductor patterns are arranged such that a pen signal transmitted from the active pen propagates in a planar direction by way of capacitance generated between the first conductor patterns and the second conductor patterns, and
    wherein the first conductor patterns and the second conductor patterns are overlaid with each other when viewed from above the pen sensor, and wherein a pen signal transmitted from the active pen propagates in a planar direction by way of capacitance generated between the first dummy patterns and the second dummy patterns.

7. The pen sensor according to claim 6,
wherein the first dummy patterns step over the second sensor electrodes in a position where the first dummy patterns are overlaid with the second sensor electrodes, and
wherein the second dummy patterns step over the first sensor electrodes in a position where the second dummy patterns are overlaid with the second sensor electrodes.

8. The pen sensor according to claim 6,
wherein each of the plurality of first conductor patterns and the plurality of second conductor patterns is a plate-like conductor.

9. The pen sensor according to claim 6,
wherein each of the plurality of first conductor patterns and the plurality of second conductor patterns includes at least one mesh conductor.

10. The pen sensor according to claim 9,
wherein the at least one mesh conductor is shaped as a square without corners.

11. The pen sensor according to claim 9,
wherein the at least one mesh conductor includes linear conductors in parallel with two directions oblique to a direction in which the plurality of first sensor electrodes extend and to a direction in which the plurality of second sensor electrodes extend.

\* \* \* \* \*